United States Patent
Auberger

(10) Patent No.: US 7,436,984 B2
(45) Date of Patent: Oct. 14, 2008

(54) METHOD AND SYSTEM FOR STABILIZING VIDEO DATA

(75) Inventor: Stéphane Auberger, Paris (FR)

(73) Assignee: NXP B.V., Eindhoven (NL)

( * ) Notice: Subject to any disclaimer, the term of this patent is extended or adjusted under 35 U.S.C. 154(b) by 145 days.

(21) Appl. No.: 10/596,620

(22) PCT Filed: Dec. 17, 2004

(86) PCT No.: PCT/IB2004/004227

§ 371 (c)(1),
(2), (4) Date: Jun. 19, 2006

(87) PCT Pub. No.: WO2005/064919

PCT Pub. Date: Jul. 14, 2005

(65) Prior Publication Data

US 2007/0085927 A1    Apr. 19, 2007

(30) Foreign Application Priority Data

Dec. 23, 2003    (EP) .................................. 03300284

(51) Int. Cl.
*H04N 5/228*    (2006.01)
*G06K 9/00*    (2006.01)

(52) U.S. Cl. ................. 382/107; 348/208.6; 348/208.1; 348/208.99; 348/402.1; 382/236; 382/199

(58) Field of Classification Search ............... 348/402.1, 348/208.4, 208.1, 208.6, 699, 208.99; 382/107, 382/278, 190, 236; 375/240.01

See application file for complete search history.

(56) References Cited

U.S. PATENT DOCUMENTS

| | | | | |
|---|---|---|---|---|
| 5,748,231 A | * | 5/1998 | Park et al. | 348/207.99 |
| 5,926,212 A | * | 7/1999 | Kondo | 348/207.99 |
| 6,049,354 A | * | 4/2000 | Sekine et al. | 348/208.6 |
| 6,058,212 A | * | 5/2000 | Yokoyama | 382/236 |
| 2006/0274156 A1 | * | 12/2006 | Rabbani et al. | 348/208.99 |

* cited by examiner

*Primary Examiner*—Andrew W. Johns
*Assistant Examiner*—Nancy Bitar

(57) ABSTRACT

The invention relates to a method for stabilizing a video recording of a scene made by a video camera and represented by video data, said method comprising the steps of subdividing said video data into a plurality of successive frames themselves divided into a plurality of blocks, determining for each block of each frame a motion vector representing the direction and magnitude of the motion in said block, said vector at an instant t being called global motion vector GMV(t) and representing said motion at the instant t with respect to the previous frame, defining a modified vector called integrated motion vector IMV(t) at the instant t and designating the final motion vector correction to be applied to the current frame in view of its motion correction, said integrated motion vector being given by the expression:IMV(t) = GMV(t)+a (E). WIV(t−1) where a(E) is a variable adaptive factor depending on an expression E and IMV(t−1) is the integrated motion vector corresponding to the previous current frame, and modifying the video data according to the modified integrated motion vectors defined for each successive current frame.

5 Claims, 2 Drawing Sheets

| SLG | DFV |
|---|---|
| 1 to 12 | 1 |
| 13 to 14 | 0.95 |
| 15 to 17 | 0.9 |
| 18 to 21 | 0.85 |
| 21 to 24 | 0.8 |
| 25 to 30 | 0.7 |
| > 30 | 0.6 |

| SLG | DFV |
|---|---|
| 1 to 12 | 1 |
| 13 to 14 | 0.95 |
| 15 to 17 | 0.9 |
| 18 to 21 | 0.85 |
| 21 to 24 | 0.8 |
| 25 to 30 | 0.7 |
| > 30 | 0.6 |

FIG. 1

METHOD AND SYSTEM FOR STABILIZING VIDEO DATA

FIELD OF THE INVENTION

The present invention relates to a method for stabilizing video data and to a stabilizing system for carrying out said method.

BACKGROUND OF THE INVENTION

Miniaturization of video cameras in the recent years and inclusion of powerful zooms have led in these devices to an image stability problem, owing to the movement of the hand-held video camera. Digital image stabilizing (DIS) systems have then been developed in order to remove this unwanted camera movement—or jitter—and thus to produce a sequence displaying requisite camera movement only and providing a more pleasant viewing experience. Jitter, defined as all the undesired positional fluctuations (translation, rotation, etc. . . . ) of the image that are added to the intentional motion of the camera, can have a lot of significant adverse effects (for example, on motion estimation coding, since it may increase the magnitude or the number of the motion vectors and therefore a decrease in the run length of encoded motion vectors). In most DIS systems, a motion estimation is performed between two successive frames (at times t−1 and t) in order to get the global motion of the image frame. Said global motion is represented by a single vector called the global motion vector GMV(t). The problem is that the successive values GMV(t) contain both the intentional motion and the unintentional one Oitter).

The document "Fast digital image stabilizer based on Gray-coded bit-plane matching", IEEE Transactions on Consumer Electronics, vol.45, n°3, August 1999, pp. 598-603, describes a motion correction system allowing to decide whether the motion is intentional or not. To that end, the global motion vector is integrated with a damping coefficient, and the integrated motion vector IMV(t) thus defined designates the final motion vector correction to be applied to the current raw frame for motion correction. This integrated motion vector, provided for constructing a stabilized sequence, is given by the expression (1):

$$IMV(t)=a \cdot IMV(t-1)+GMV(t) \qquad (1)$$

where GMV(t) is the global motion vector for the current frame considered at the time t and a is a number comprised between 0 and 1 and playing a role according to which the integrated motion vector converges to zero when there is no camera motion. The choice of this number a, which is a damping factor, depends on the degree of stabilization desired, but it is crucial considering the type of camera motion, and the use of a constant value (for example) is often sub-optimal.

In fact, separating the intentional motion from jitter over the course of a sequence is always a complex problem. For a real-time application, the main constraint is moreover that no delay is allowed, i.e. it is not possible to store some frames in memory and to apply the motion correction later, once the movement can be better known. All the solutions proposed to that end in the literature have more or less the same drawback: the jitter is attenuated—but not cancelled—in portions of sequences that have a low amplitude jitter and fixed position, but as soon as there is a panoramic motion or any other type of strong camera motion, the output filtered sequence hardly follows the real motion or follows it after a long delay. Moreover, the sampling window used for filtering causes a delay that is noticeable when correcting low amplitude jitter. There is consequently a trade-off between the strength for attenuating low amplitude jitter and the ability to follow intentional motion with a delay as low as possible.

SUMMARY OF THE INVENTION

It is therefore an object of the invention to propose a filtering method allowing to perform an improved motion correction.

To that end, the invention relates to a method for stabilizing a video recording of a scene made by a video camera and represented by video data, said method comprising the steps of:
subdividing said video data into a plurality of successive frames;
dividing each of said successive frames into a plurality of blocks;
determining for each block of each frame a motion vector representing the direction and magnitude of the motion in said block, said motion vector GMV at an instant t being called global motion vector GMV(t) and representing said motion at the instant t with respect to the previous frame;
defining a modified vector, called integrated motion vector IMV(t) at the instant t and designating the final motion vector correction to be applied to the current frame in view of its motion correction, said integrated motion vector being given by the expression:

$$IMV(t)=GMV(t)+a(E) \cdot IMV(t-1)$$

where GMV(t) is the global motion vector of the current frame at the instant t, a(E) is a variable adaptive factor depending on an expression E and IMV(t−1) is the integrated motion vector corresponding to the previous current frame; and
modifying the video data according to the modified integrated motion vectors defined for each successive current frame.

In a preferred embodiment, said variable adaptive factor depends on the sum of the two last global motion vectors.

Preferably, the variable damping factor is calculated independently for the horizontal and vertical coordinates of the IMVs and GMVs, and thus the filtering along the two axes is always independent from each other.

It may also be checked if the IMV correction is not above a given threshold, corresponding to the extra input area authorized; if so, the correction is modified in order to stay within a predetermined allowed range, .+−. 16 pixels for example.

BRIEF DESCRIPTION OF THE DRAWINGS

The present invention will now be described, by way of example, with reference to the accompanying drawings in which:

FIG. 1 is a table giving some examples of the value of the damping factor value used in the stabilizing method according to the invention;

DETAILED DESCRIPTION OF THE INVENTION

Figure 2:
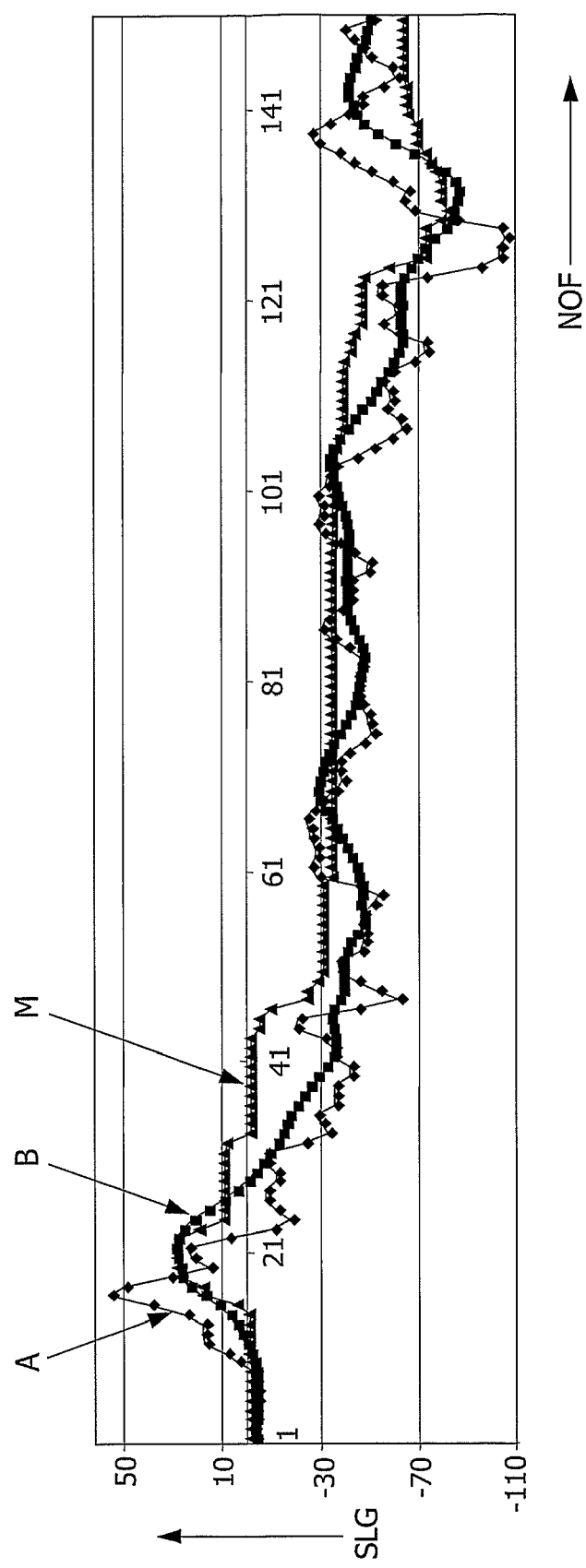
FIG. 2 illustrates the advantage of the stabilizing method according to the invention.

In accordance with the present invention, a stabilization method is proposed in which the proposed correction is now equal to the integrated motion vector IMV(t) previously defined, but with a damping coefficient denoted a(E) and which is now a variable adaptive factor:

$$IMV(t)=a(t, t-1,\ldots) \cdot IMV(t-1)+GMV(t) \qquad (2)$$

In this expression (2), the damping factor a(E) is now no longer a constant value, but an adaptive one depending for instance on the sum of the two last global motion vectors. This allows to track the beginning of intentional motion (the last global motion vector being usually too instable to be used per se).

The correspondence table between the damping factor a(E) and the sum (GMV(t)+GMV(t−1)) of the two last global motion vectors is built in the following way:

(a) a low sum of GMV values implies a high damping factor value, which strongly stabilizes the sequence, as if assuming an intentional static camera position;

(b) a high sum of GMV values implies a low damping factor value, and the sequence then follows more precisely the original motion.

An example of damping factor values DFV versus increasing sums SLG of the last two global motion vectors in quarter pel units is given in the table of FIG. 1.

Some additional features may be proposed. It is for example advantageous if one has a filtering on the x-vector independent of y-vector filtering. Moreover, an out of bounds detection may be provided: said detection allows to check if the IMV correction is not above a given threshold, corresponding to an extra input area authorized, and to correct it to stay within an allowed range, for instance +/−16 picture elements (pixels).

The proposed stabilizing method thus creates long stabilized shots when jitter is centered around a certain spatial position, while following intentional motion when the motion is too high, as illustrated in FIG. 2 which shows simultaneously the original motion (curve A), the motion conventionally filtered by a moving average filter (curve B), and the curve M of the motion filtered by the stabilizing method according to the invention (for these three curves, the horizontal axis corresponds to the number of frames NOF and the vertical one to the cumulative displacement, i.e. to the sum SLG of the global motion vectors). Some fast moving transitions are still visible, but they generally correspond to abrupt motion in the original sequence that must be followed in some way, if one wants to stay within the allowed extra image bounds. The stabilizing method is also effective in tracking slow moving motion.

The invention claimed is:

1. A method for stabilizing video data, said method comprising the steps of:
   subdividing said video into a plurality of successive frames
   dividing each of said successive frames into a plurality of blocks;
   determining for each block of each frame a motion vector representing the direction and magnitude of the motion in said block, said vector GMV at an instant t being called global motion vector GMV(t) and representing said motion at the instant t with respect to the previous frame;
   defining a modified vector, called integrated motion vector IMV(t) at the instant t and designating the final motion vector correction to be applied to the current frame in view of its motion correction, said integrated motion vector being given by the expression:

$$IMV(t)=GMV(t)+a(E) \cdot IMV(t-1)$$

where GMV(t) is the global motion vector of the current frame at the instant t, a(E) is a variable adaptive factor depending on an expression E and IMV(t−1) is the integrated motion vector corresponding to the previous current frame; and
   modifying the video data according to the modified integrated motion vectors defined for each successive current frame.

2. A stabilizing method according to claim 1, in which said variable adaptive factor depends on the sum of the two last global motion vectors.

3. A stabilizing method according to claim 2, in which the variable adaptive factor a(E) is determined independently for the horizontal and vertical coordinates of the vectors.

4. A stabilizing method according to claim 1, comprising an additional correction step, provided for checking if the correction of motion vector is not above a given threshold and, if yes, modifying said correction so that it stays within a predetermined allowed range.

5. A system for stabilizing video data, said system comprising:
   a frame storage for storing a plurality of successive frames of video data of the video recording;
   a processor coupled to said frame storage for dividing each frame into a plurality of blocks, determining for each block of each frame a motion vector which represents the direction and magnitude of the motion in said block, said vector at an instant t being called global motion vector GMV(t) and representing said motion at the instant t with respect to the previous frame, defining a motion vector, called integrated motion vector IMV(t) at the instant t and designating the final motion vector correction to be applied to the current frame in view of its motion correction, said integrated motion vector being given by the expression $$IMV(t)=GMV(t)+a(E) \cdot IMV(t-1)$$

where GMV(t) is the global motion vector of the current frame at the instant t, a(E) is a variable adaptive factor depending on an expression E and IMV(t−1) is the integrated motion vector corresponding to the previous current frame, and modifying the video data according to the modified integrated motion vectors defined for each successive current frame.

* * * * *